Oct. 30, 1923.
T. B. DRESCHER
1,472,748
DEVICE FOR POSITIONING LENS BLANKS ON BLANK HOLDERS
Filed Oct. 20, 1921 2 Sheets-Sheet 1
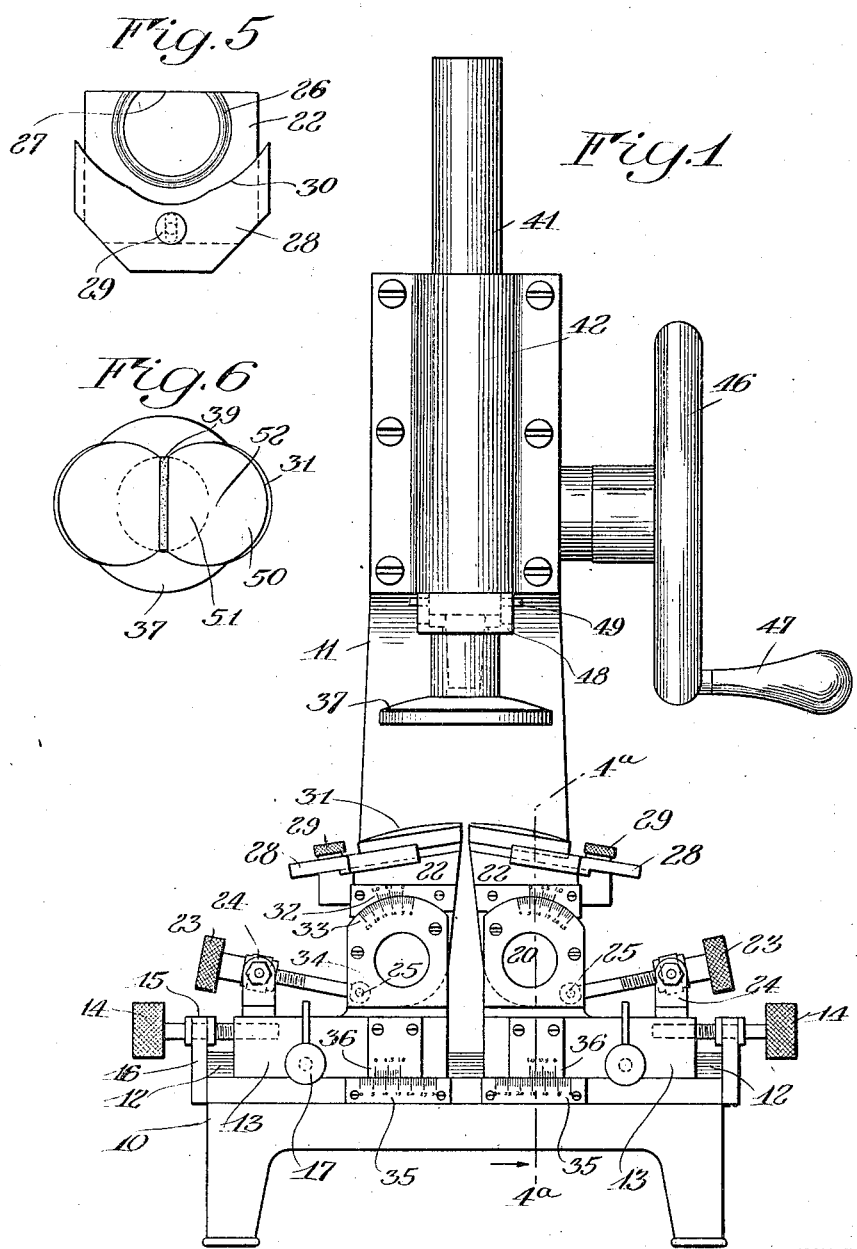
INVENTOR.
Theodore B. Drescher
BY
his ATTORNEY

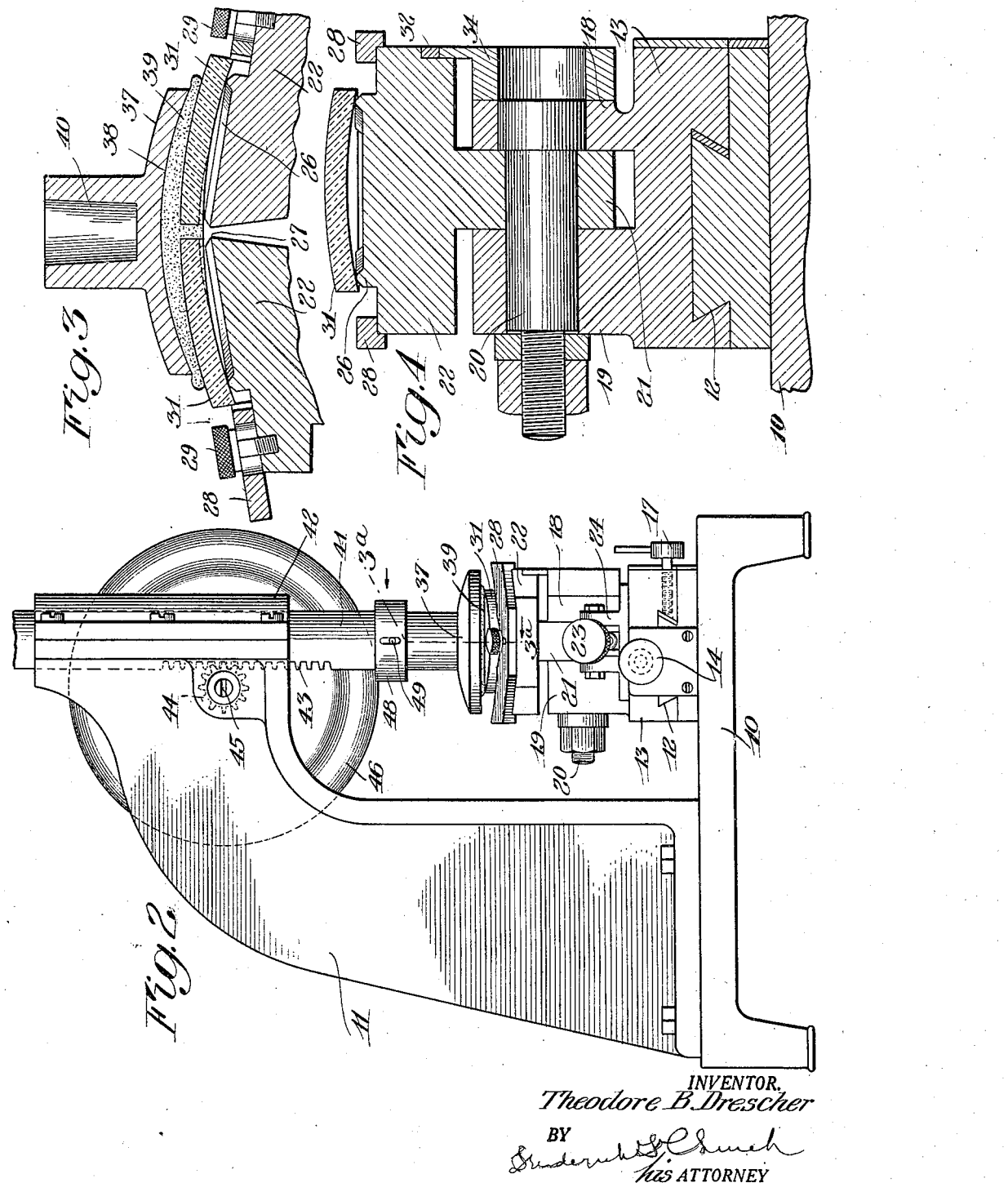

Patented Oct. 30, 1923.

1,472,748

UNITED STATES PATENT OFFICE.

THEODORE B. DRESCHER, OF ROCHESTER, NEW YORK, ASSIGNOR TO BAUSCH & LOMB OPTICAL COMPANY, OF ROCHESTER, NEW YORK, A CORPORATION OF NEW YORK.

DEVICE FOR POSITIONING LENS BLANKS ON BLANK HOLDERS.

Application filed October 20, 1921. Serial No. 509,063.

*To all whom it may concern:*

Be it known that I, THEODORE B. DRESCHER, of Rochester, in the county of Monroe and State of New York, have invented certain new and useful Improvements in Devices for Positioning Lens Blanks on Blank Holders; and I do hereby declare the following to be a full, clear, and exact description of the same, reference being had to the accompanying drawings, forming a part of this specification, and to the reference numerals marked thereon.

This invention has to do with lens grinding apparatus and more particularly with means for positioning blanks on the blank holders or chucks of lens grinding machines, the chief object of the invention being to provide a simple, convenient and effective device of this character for suitably positioning a plurality of bifocal lens blanks on a common holder, preparatory to grinding the reading portions of the blanks simultaneously in accordance with a common practice in the art. To these and other ends the invention resides in certain improvements and combinations of parts all as will hereinafter be more fully described, the novel features being pointed out in the claims at the end of the specification.

In the drawings:

Figure 1 is a front elevation of a device embodying the present invention.

Figure 2 is a side elevation of the same.

Figure 3 is a section on the line 3ª—3ª of Figure 2.

Figure 4 is a section on the line 4ª—4ª of Figure 1.

Figure 5 is a top plan view of one of the lens positioning members detached and

Figure 6 is a plan view of a lens holder with a pair of lenses positioned thereon.

Similar reference numerals throughout the several views indicate the same parts.

It is a common practice in the art of lens grinding to fix two or more bifocal lens blanks in abutting relation on a holder or chuck, as by means of a suitable adhesive, and grind the adjacent surface portions of the blanks simultaneously to form the reading portions of the lenses. In fixing the blanks on the holder it is desirable to position them so that the curvature of the surface of the reading portion of each lens will lie substantially tangent to the curvature of the surface of the distance portion of the lens, adjacent the center of the latter, or in other words so that there will be a comparatively smooth transition from the surface of one portion to that of the other, in order that there may be little or no interference with the vision. This arrangement is shown in Figure 6 of the drawings where two bifocal blanks are shown positioned on a holder for grinding the reading lens portion indicated in dotted lines. Such positioning of the surfaces is obtained by tilting the blanks relative to the surface of the reading lens a portion of which is to be ground simultaneously on each of the blanks; and therefore by tilting the blanks relative to each other, having due regard of course to the character of curvature of the reading and distance lens portions. It is the main object of the present invention, therefore, as already stated, to provide advantageous means for properly positioning the blanks on the holder to accomplish the desired arrangement described above.

The embodiment of the invention selected for the purpose of the present disclosure comprises preferably a frame having a base or bed portion 10, Figure 1, carrying an overhanging standard 11. The base portion 10 of the frame is formed with guideways 12 over which move, toward and from each other, a pair of slides 13. An adjusting screw 14 threadedly engages the outer end of each slide and is swivelled as at 15 in a lug 16 on the base, for accurately adjusting the slides toward and from each other. A screw 17 is provided in each slide for engagement with the guideway to lock the slide after adjustment.

Each slide 13 has at its inner end a pair of spaced, upstanding lugs 18 and 19, Figure 4, carrying the ends of a bolt 20. Pivotally supported on the bolt is a depending lug 21 of a member or block 22 serving as a blank support or anvil. For pivotally adjusting each member 22 there is provided a corresponding screw 23, Figure 1, engaging a nut swivelled between upstanding lugs 24 on each slide and having one end pivotally connected as at 25 with the lower portion of the lug 21 of the blank supporting member. By turning screws 23, supporting members 22 are tilted on their pivots.

The upper surface of each lens supporting member or block 22 has formed thereon a circular portion or annular shoulder 26, Figure 5, for engagement with the surface of a lens. The supporting portions 26 are not in the present instance complete circles being for convenience partly cut away at 27 on the adjacent sides of the members, but they have sufficient extent to provide seats for engaging and firmly supporting lens surfaces of any curvature in a definite fixed position on the members. Slidably carried at the outer end of each member or block 22 is a gage 28 for the blank having slotted engagement with a clamping screw 29. The inner side of the gage is curved as at 30 for contact with the edge of the blank to center the same from front to rear member 22, it being understood that the gages are slidable toward and from each other and are set for locating blanks of different dimensions on the members 22. The blanks are indicated at 31 in position on the supporting members.

For indicating the positions of pivotal adjustment of the blank supporting members, there is provided on each a vernier scale 32 cooperating with a fixed scale 33 marked off in angular degrees on the surface of a ring 34 fixed on the stationary lug 18 of the slide. Similarly for indicating the positions of adjustment of each slide on the base there is marked on the base a fixed scale 35 corresponding for convenience with scale 33 and having cooperating therewith a vernier scale 36 marked on the slide.

The blank holder is shown at 37, having a curved surface 38 to which the blanks are fixed as by means of a suitable adhesive substance indicated at 39, such for example as pitch, in which while soft the blanks are imbedded during the positioning operation, and by which they are firmly fixed to the holder when the pitch becomes set. The holder has in the present instance a tapered socket 40 with which engages a corresponding tapered lower end on a spindle or arbor 41 sliding longitudinally, toward and from the blank supporting members 22, in a bearing 42 carried by the standard 11. The spindle is provided with a rack 43 with which meshes a pinion 44 on a shaft 45 rotatably carried in the standard and having fixed thereon a hand wheel 46 provided with a handle 47 by means of which the pinion may be rotated to raise and lower the spindle and the blank holder. The pitch coated surface of the holder may thus be brought down on the blanks resting on members 22 and then raised to pick up the blanks which are thus imbedded in the pitch in proper position on the holder for grinding the reading lens portions. The lower end of the spindle carries a collar 48 sliding longitudinally thereon and arranged for engagement with the upper end of the blank holder shank. The collar is slotted for limiting engagement with pins 49 fixed in the spindle, from which it is apparent that when the holder is located on the spindle its upper end engages and raises the collar 48. After the blanks have been positioned on the holder, the spindle carrying the latter may be raised by the means described and as shown in Figure 1, until the collar strikes the lower end of the spindle bearing 42 which forces the collar downwardly on the spindle against the blank holder so as to loosen or strip the latter from the spindle.

Figure 6 shows a pair of blanks positioned on the holder, the distance portion of the blank being indicated generally at 50 and the reading portion at 51. The blanks are positioned by means of the present invention so that when the reading portion 51 is ground its curved surface lies substantially tangent as at 52 with the surface of the distance portion of the blank so that there is a minimum change of shape between the two portions of the lens and therefore a minimum interference with the vision.

In operation, the blank supporting members 22 are tilted equally about their pivotal centers so that the blank engaging portions 26 make the desired angle with each other, as indicated by scales 33, for properly positioning the blanks on the holder. The slides are adjusted toward and from each other equally by reference to scales 35 to the extent necessary for bringing the adjacent edges of the blanks into the desired proximity and for locating the blanks symmetrically relative to the holder axis gages 28 being shifted if necessary for marking the proper position of the blank on the member. The blanks having been placed on the supporting members 22, and the holder with its surface supplied with adhesive secured to the lower ends of spindle 41, the holder is lowered into engagement with the blanks which are imbedded in and held by the adhesive in proper position relative to the holder to which they are securely fixed by the setting of the adhesive. The holder is then raised, carrying the blanks with it and is stripped from the carrying spindle by the means described. Of course, the members 22 and their supporting parts may be arranged for movement toward and from the carrier instead of the movement of the latter for the purpose of bringing the blanks and holder together.

As apparent from the drawings the device is simple and practical in character and conveniently adjusted for handling blanks of various sizes and lens curvatures. The adjustments are accurately made by the vernier scales provided and the machine is adapted for rapidly accomplishing the results described.

I claim as my invention:

1. A device for positioning lens blanks on a blank holder comprising a plurality of positioning members provided with blank supporting portions and mounted for relative tilting movement to vary the angular relation between said portions, and a carrier for a blank holder, said carrier being movable toward and from said members to bring the blanks and holder together.

2. A device for positioning lens blanks on a blank holder comprising a plurality of positioning members each provided with a blank supporting portion, devices for relatively moving said members to vary the angular relation between said supporting portions, a carrier for a blank holder, and means for moving said carrier toward and from said members to bring the blanks and holder together.

3. A device for positioning lens blanks on a blank holder comprising a plurality of positioning members each provided with a circular blank supporting portion, devices for relatively tilting said members to vary the angular relation of said portions, and a carrier for a blank holder, said carrier being movable toward and from said members to bring the blanks and holder together.

4. A device for positioning lens blanks on a blank holder comprising a pair of pivotally mounted positioning members each having a blank supporting portion thereon, said members being relatively tiltable to vary the angular relation between said supporting portions, and a carrier for a blank holder, said carrier being movable toward and from said members to bring the blanks and holder together.

5. A device for positioning lens blanks on a blank holder comprising a pair of pivotally mounted positioning members each having a circular blank supporting portion thereon, said members being relatively tiltable to vary the angular relation between said supporting portions, and a carrier for a blank holder, said carrier being movable toward and from said members to bring the blanks and holder together.

6. A device for positioning lens blanks on a blank holder comprising a pair of pivotally supported positioning members provided with blank supporting portions, devices including screw means and indicating means for relatively tilting said members to vary the angular relation between said supporting portions, and a carrier for a blank holder movable toward and from said members to bring said blanks and holder together.

7. A device for positioning lens blanks on a blank holder comprising a plurality of positioning members provided with blank supporting portions, devices pivotally supporting said members for relative angular adjustment of said supporting portions, devices for relatively moving said pivotal devices toward and from each other, and a carrier for a blank holder, said carrier being movable toward and from said members to bring said blanks and holder together.

8. A device for positioning lens blanks on a blank holder comprising a plurality of positioning members provided with blank supporting portions, devices including screw means and indicating means pivotally supporting said members for relative angular adjustment of said supporting portions, devices including screw means and indicating means for relatively moving said pivotal devices toward and from each other, and a carrier for a blank holder movable toward and from said members to bring said blanks and holder together.

9. In a device for positioning lens blanks on a blank holder, the combination of a frame provided with ways, slides movable over said ways toward and from each other, a member pivotally supported on each of said slides and provided with blank holding means, and devices for pivotally adjusting said members on said slides and for moving the latter over said ways.

10. In a device for positioning lens blanks on a blank holder, the combination of a frame provided with ways, slides movable over said ways toward and from each other, a member pivotally supported on each of said slides and provided with blank holding means, adjusting screws for pivotally adjusting said members and for adjusting said slides on said ways, and scale means for indicating the positions of adjustment of said members and slides.

11. In a device for positioning lens blanks on a blank holder, the combination of a frame provided with ways, slides movable over said ways toward and from each other, a member pivotally supported on each of said slides and provided with blank holding means, adjusting screws for pivotally adjusting said members and for adjusting said slides on said ways, scale means for indicating the positions of said members and slides, and a carrier for a blank holder movable on said frame toward and from said members to bring said blanks and holder together.

12. In a device for positioning lens blanks on a blank holder, the combination of a frame provided with ways, slides movable over said ways toward and from each other, a member pivotally supported on each of said slides and provided with a circular blank supporting shoulder, adjustable blank locating gauges on said members adjusting screws for pivotally adjusting said members and for adjusting said slides on said ways, scale means for indicating the positions of said members and slides, and a carrier for a blank holder movable on said frame toward and from said members to bring said blanks and holder together.

13. In a device for positioning lens blanks on a blank holder, the combination of a frame provided with ways, slides movable over said ways toward and from each other, a member pivotally supported on each of said slides and provided with blank holding means, a spindle slidable longitudinally on said frame toward and from said members and having an end formed to carry a blank holder, rack and pinion means for sliding said spindle to bring the blanks and holder together, and means for stripping the holder from said spindle when the latter is moved away from said members.

THEODORE B. DRESCHER.